Dec. 16, 1941.          E. N. MULLER                2,266,064
              THERMIONIC VALVE CIRCUITS
              Filed Dec. 23, 1937         3 Sheets-Sheet 1

Inventor
Egon Nicolas Muller
By Watson E. Coleman
Attorney

Dec. 16, 1941.  E. N. MULLER  2,266,064
THERMIONIC VALVE CIRCUITS
Filed Dec. 23, 1937  3 Sheets-Sheet 2

Inventor
Egon Nicolas Muller
By Watson E. Coleman
Attorney

Dec. 16, 1941.    E. N. MULLER    2,266,064
THERMIONIC VALVE CIRCUITS
Filed Dec. 23, 1937    3 Sheets-Sheet 3

Inventor
Egon Nicolas Muller
By Watson E. Coleman.
Attorney

Patented Dec. 16, 1941

2,266,064

UNITED STATES PATENT OFFICE 2,266,064

THERMIONIC VALVE CIRCUITS

Egon Nicolas Muller, Esch, Alzette, Luxemburg

Application December 23, 1937, Serial No. 181,317

9 Claims. (Cl. 177—311)

This invention in the main is concerned with the indirect control, or remote control, of various apparatus, such as variable impedances in electric transmission systems, in which it is desired to select by means of a motor one of a plurality of possible settings. The invention is particularly useful when it is desired to have control from a plurality of distant points, in response to manual control, the various control points being independent from one another.

A considerable advantage of the invention consists in providing cheap and efficient apparatus to carry out such indirect control. Preferably the device is controlled in response to a brief "touch" without it being necessary to provide a plurality of holding relays or other expensive electro-mechanical apparatus.

The invention is shown more particularly, by way of example, in connection with a radio receiver wherein it is desired to operate indirect or remote tuning.

The above broad objects may conveniently be attained by providing a storage condenser or like device wherein a potential responsive to the control operation at the desired distant point is stored to effectuate in a subsequent control step automatically the adjustment of the motor in response to this potential.

According to another feature of the invention, there is provided a balancing impedance and a so-called discriminator system for detecting the condition of balance of the stored potential with respect to a potential locally defined by the momentary setting of a motor-controlled spindle, and preferably also the sense of unbalance, whereby to permit a speedy correction of motor setting.

The invention also provides various efficient arrangements for effectuating such discrimination, and including for instance an amplifier tube, or a plurality of tubes, with or without an electromagnetic relay in association with the motor control means. Means are preferably also provided for avoiding any damage due to overload, of this tube, and to ensure a very high sensitivity and a very reliable and accurate motor arrest. The invention also provides various arrangements which may include a desired auxiliary source of A. C. voltages, and be adapted to ensure utmost ease in designing and adjusting the coupling between the utilization device arranged to control the motor, and the discriminator means proper.

It is also an object of the invention to provide various devices for effecting the selection of the required control potential corresponding to the desired position of the utilization device. According to a preferred form of these devices, the potential is derived from a resistor or a contact system along which is maintained a potential gradient and with which is associated a resilient contact strip or rail for operation through a brief "touch" to establish the wanted contact at a desired position indicating, for example, the call sign of a radio station, the arrangement being preferably in the form of a large sized indicator board.

Further objects of the invention are to provide means for association with the potential selector mechanism above described, for indicating the set position of the utilization device on the large sized indicator board; and furthermore to provide means for aiding in selecting the desired position of contact on the indicator board.

This invention also provides the combination of an indirect control system with a radio receiver including appropriate dial constructions adapted to show off the setting of the tuning means therein, and arranged in such a way that by briefly depressing suitable means with the finger-tip the call sign or frequency indication of a desired station is automatically registered and the corresponding program tuned in. Means may also be provided in combination with a large-sized dial for visualizing, in response to a preliminary manual operation, a selected group of station call signs or equivalent, as by providing enhanced illumination of selected spots of the tuning dial, to facilitate the quick location of a desired one amongst the thus preselected callsigns, whereby the respective station may be easily selected and tuned in.

According to another specific object of this invention, means are provided including a desired source of A. C. voltages, of substantially non-critical and preferably moderately high frequency, in association preferably with a rectifier system adapted to modify the input impedance of an amplifier, and with output rectifier means, for the purpose of carrying out various control operations in radio receivers and other thermionic apparatus. Moreover this feature of the invention is particularly well adapted to operate as a discriminator for use with the above indirect control system in ensuring utmost circuit independency, from the D. C. point of view, between the storage condenser system and associated utilization device for controlling the motor circuit, so as to permit a great variety in possible circuit combinations.

Other specific objects of this invention will be found in connection with the description hereinafter set forth, with reference to the annexed drawings, wherein.

Figure 1:
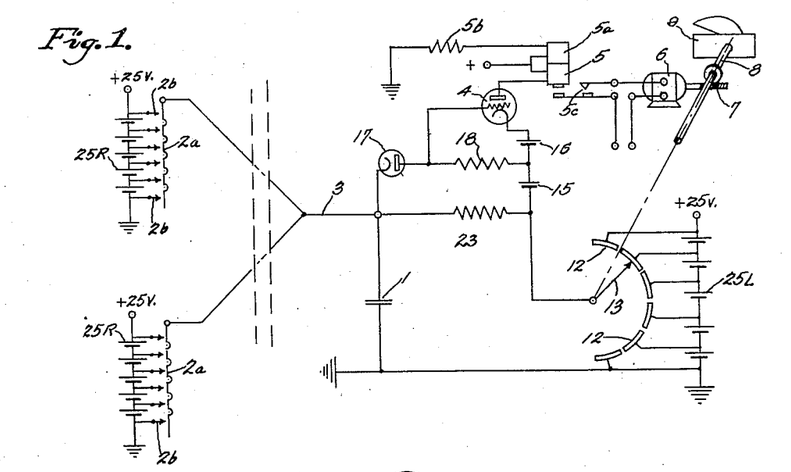
Fig. 1 illustrates a simple arrangement for adjusting a motor to one of a predetermined number of positions in accordance with the potential stored across a reservoir condenser.

Reference should now be had to the motor control system shown in Fig. 1. 1 denotes a reservoir condenser, preferably having a high capacity such as 4 or 6 microfarads, and a very high leakage resistance, a paper condenser being suitable in practice. One of the terminals of the condenser is grounded, and the other one, hereinafter referred to as the active terminal, is arranged to be charged from a source of a D. C. potential at selected amplitude and in positive polarity relative to ground, to define in turn a selected angular adjustment of a motor 6. Charging of the condenser 1 is effected through the lead 3, by means of one of the two selector devices shown in the left-hand portion of Fig. 1, and which may be referred to hereinafter as the remote controlling points. This of course does not imply that the controlling points be physically remote from the reservoir condenser 1; furthermore, any desired number of control points may of course be provided. The different remote controlling points are connected in parallel, which means that the thereat selected potentials are all derived through the same lead 3, and it will be sufficient to consider in detail the construction and operation of the potential selector device at a single remote control point.

As shown, one of a predetermined number of potentials may be selected at the desired remote control point, by means of a corresponding number of press-buttons, each of which comprises a resiliently positioned movable contact-blade 2a adapted on depression to establish a contact with a fixed contact-point 2b. All the movable contact-blades 2a are connected to the lead 3, whereas the different fixed contact-points 2b are respectively connected to taps on a battery or other potential divider and source of D. C. potentials, indicated at 25R; the potentials from the different taps conveniently differ by a uniform amount; of course it is not necessary that the press-buttons respectively associated with the uniformly staggered potentials be physically contiguous. The potential across the control supply source 25R in practice depends on the number of selectable intermediate taps, and in a practical construction may be 25 volts, at +25, relative to ground. It will be understood that the lead 3 is normally disassociated from all the contact-points 2b, at the remote control point, or at each remote control point, except when a potential is positively being selected by the operator at the desired remote control point; the condenser 1 may accordingly tend to preserve the potential of the contact-point 2b selected in the last place, as considered more fully hereinafter. On the other hand, the reservoir condenser as shown is permanently left connected to the motor control circuit considered hereinafter and referred to as the discriminator circuit.

The motor 6 may or may not be of the so-called reversible type, and its spindle is geared through a slow-motion drive 7 to the spindle 8 of the tuning condenser 9 or other desired impedance in a radio receiver; this impedance may be adjusted to the desired one of a number of predetermined broad positions, corresponding to the number of selector-buttons 2a—2b at the remote control point.

The discriminator circuit, by which the motor 6 is caused to be adjusted to the required broad angular position, under the influence of the potential which is caused to be stored across condenser 1, will now be considered more particularly. This circuit is designed to have a very low current consumption, and includes a thermionic tube 4 and a potentiometer or balancing impedance with a moving contact-finger 13, fast on the spindle 8, and adapted to sweep across a plurality of broad stationary contact-studs 12. The number of contact-studs corresponds to the number of selectable tuning positions, and of press-buttons at each remote control point. The different contact-studs are connected to taps with progressively and uniformly staggered potentials on a battery 25L or other potential divider and source of D. C. potentials, the different taps in the arrangement shown having substantially exactly the same potential values as the taps connected to the contact-points 2a at the remote control points, the source 25L having one terminal grounded and the other terminal, indicated at +25, if desired being connected to the terminal +25 at the remote control point. The grid of the thermionic tube 4 is connected to the lead 3 and active terminal of the reservoir condenser through a diode 17 or other uni-directional conductor, the purpose of which will be detailed hereinafter. The cathode of the tube 4 is connected to the contact-finger 13 through two series-connected sources of biasing voltages such as batteries, respectively indicated at 15 and 16. The purpose of these potential sources is to define the normal or steady grid bias of the control grid relative to the cathode.

The voltage of source 16 is comparatively low, the junction of 15 and 16 serving to define a low negative biasing voltage of the grid, such as —2 volts. The resultant voltage across the two sources 15 and 16, approximately defines, or is slightly higher than, the normal bias of the control grid, and may be —4 volts with a thermionic tube of conventional construction and comparatively high sensitivity. The cathode of the diode 17 is connected to the active condenser terminal, while the anode of the diode is connected to the control grid and to the junction of the biasing sources 15 and 16, through a resistor 18 of very high resistance, such as 8 megohms. As will be apparent hereinafter, the biased diode 17 permits to increase the sensitivity of the discriminator by making possible the use of a tube with reduced cut-off bias, and of a high control voltage at 25R, while avoiding overload under any operating conditions.

The active condenser terminal is connected to the contact-finger 13 through a leak resistor 23 of very high resistance, such as 5 megohms; the purpose of this resistor is to stabilize the system, as considered hereinafter.

The anode of the tube 4 is connected to the high-tension supply through the energizing coil 5 of an electro-magnetic relay, provided with a differentially connected winding 5a on the same magnet core. The coil 5a is connected to ground through a resistor 5b of proper resistance serving approximately to compensate the normal flow of anode current, i. e. the anode-current taking place with normal grid bias as defined in the above. The relay is provided with a contact 5c connected in series with the motor coils and with the supply voltage for the motor. The relay-contact is normally open, and with the energizing effects of the relay-coils 5, 5a, cancelling each other. It will be understood that a change of grid-bias with respect to the normal bias value, by causing either increase or decrease of the normal anode current, will cause different energizing effects of the coils 5a and 5b, to close the relay-contact 5c and to start rotation of the motor. The sense of rotation in the particular arrangement here considered, is not defined directly by the potential stored across the reservoir condenser 1, and the motor may be considered as rotating normally in a predetermined sense, for instance clockwise. The tuning impedance 9 as well as the balancing impedance 12—13 may be of a type devoid of any abutment, whereby all possible angular positions may successively be reached; if preferred, the disposition may be of the well-known type wherein the motor is caused to reverse its sense of rotation each time one extreme position or other of the spindle 8 is reached.

The operation of the system shown in Fig. 1 may be as follows: Due to the presence of the leak resistor 23, the steady potential of the condenser 1 tends to be exactly the same as the potential which the contact-finger 13 tends to assume in accordance with its instant position relative to the contact-studs 12.

Since however the anode of diode 17 is at a slightly higher potential than the cathode of the diode, due to the presence of the biasing source 15, the diode is normally conducting and it will be seen that in effect the active terminal of the condenser 1 is connected to the junction of a potential divider mainly formed by the two resistors 23 and 18 which are shunted across the source 15, and the steady potential of lead 3 tends to remain higher than the instant potential of contact-finger 13, by a fraction of the voltage of source 15; for the sake of simplicity of disclosure, this slight steady potential difference between lead 3 and contact-finger 13 will not be further considered hereinafter, since it does not affect the operation proper.

Now assume that one of the press-buttons is depressed at a remote control point, to establish a connection between the active condenser terminal through lead 3 to one of the taps of the potential source 25R, the said potential being supposed different from the potential of condenser 1 defined by the instant position of contact-finger 13. Immediately the selector button is depressed, the potential of the active condenser terminal with respect to ground will be exactly the same as the potential of the tap of battery 25R rendered effective, and any further potential change will not occur thereafter, whatever be the period of time during which the button is held depressed. It will be understood however that in practice the operator will but briefly "touch" the selected button, so that full advantage may be taken of the storage property of the system, and it will be observed that in such case, owing to the inertia of operation of the relay 5—5a, the operation of the motor system will be solely defined by the potential stored across the input terminals of tube 4. Owing to the very high leak resistance of all circuit elements associated with the reservoir condenser, the condenser charge will not change appreciably for a brief period of time such as a few seconds, in which the motor may be accurately adjusted in accordance with the stored indication.

Suppose that the potential across the reservoir condenser is lower than the potential of contact-finger 13. The diode 17 in such case will be left conducting, and the potential of the grid of tube 4 will be exactly the same as the potential of the active condenser terminal, while the potential of the cathode of the tube will be left unchanged; in practice the grid bias may considerably increase beyond the cutoff point; the operation of the system of course is not thereby affected.

The thus increased negative bias of the tube will cause a decreased anode current, and the energizing influence of relay-coil 5a will become predominant, causing the closure of the relay-contact 5c, and the rotation of the motor, for instance in the clockwise direction; as indicated in the above, whereby to cause the slider 13 to sweep across the different contact-studs 12. If it is supposed that clockwise rotation corresponds to decreased potentials of the slider 13, it will be appreciated that soon a position will be reached in which the decreased negative potential of the slider corresponds to the selected low potential of the reservoir-condenser; the relay will be de-energized as soon as there is a sufficient small potential difference between the condenser and contact-finger 13; if the two potentials do not register sufficiently perfectly, the potential of the condenser will in due course be changed in accordance with the potential of the contact-finger, due to leakage, as indicated in the above. It will be understood, that if clockwise rotation would correspond to increasing potentials of contact-finger 13, the motor would continue to rotate as set forth in the above, whereby with some small delay the proper contact-stud would be reached.

Now suppose that the potential stored across condenser 1 is higher than the instant potential of contact-finger 13. As long as the potential difference is lower than the voltage across source 15, the diode 17 will be left conducting, and the potential of the grid of the tube will therefore be exactly that of the active condenser terminal. The resultant decreased negative bias of tube 4 will cause an increased anode current, and the energizing effect of relay-coil 5 will predominate, causing the closure of contact 5c, the motor rotating in the predetermined sense until the proper contact-stud is reached by slider 13, whereat the potential of the contact-finger may be substantially exactly balanced by the potential of lead 3.

In practice it is useful to employ substantially high potential differences between the taps of the voltage sources 25R and 25L, so that the potential stored across the reservoir condenser will accordingly be substantially higher, in any case, than the potential of contact-finger 13. The potential of the cathode of diode 17 may accordingly be substantially higher than the potential of the anode of the diode, as defined by the junction of the biasing potential sources 15 and 16, causing the diode to be non-conductible, whereby the grid of tube 4 will be left virtually connected to the tap 15—16, which corresponds to a predetermined low negative bias. The operation of the relay of course is left unchanged, and it will be observed that damaging of the tube is effectively prevented. In practice it is useful to employ a relay of moderate sensitivity only, which does not respond to slight bias changes of the control grid, adequate sensitivity of the system being reached through a high control voltage at 25R, whereby excellent stability and low expense of the system may be ensured.

The application of the invention is particularly useful when it is desired to select one of a very high number of positions, or in fact any desired angular positions of the motor spindle; it will be appreciated that in like cases, conventional dispositions using holding relays or other electromagnetic means, besides being very expensive, may not be usefully employed.

Figures 2, 3, 4, 5, 6:
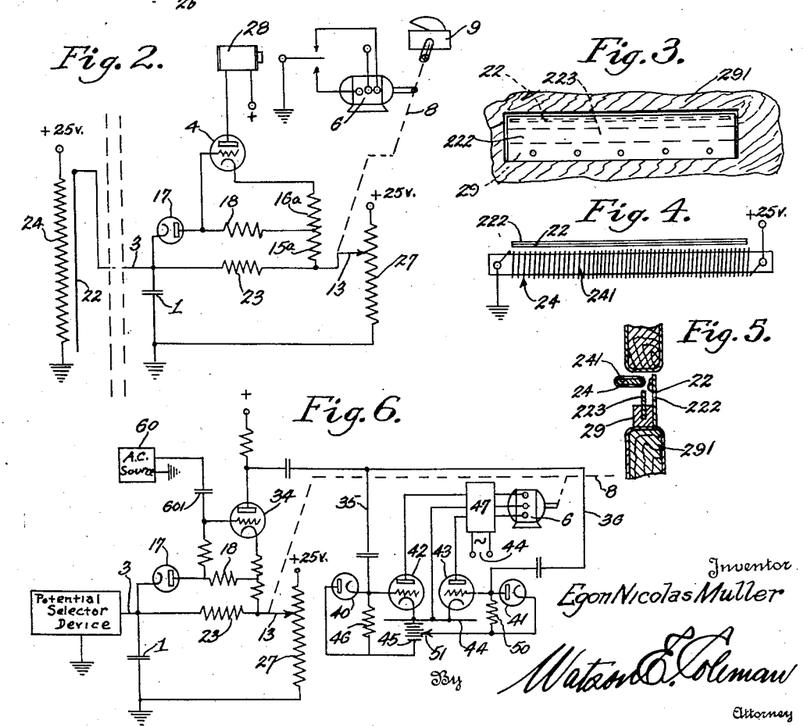
Fig. 2 illustrates an improved arrangement, adapted to permit selection of any desired intermediate potentials and positions out of a wide range of possible values.
Figs. 3, 4 and 5 illustrate constructional details of a preferred form of the potential selector represented in Fig. 2.
Fig. 6 illustrates an alternative form of discriminator circuit for controlling the motor in accordance with the stored potential.

One suitable arrangement providing this advantage, and applied to control the tuning of a radio receiver, is illustrated in Fig. 2. Control as shown is from one of two distant control points, whereat the potential selector devices may be constructed in the same fashion, a single one being considered in detail.

The remote control point includes a resistor of potentiometer 24 connected across ground and the potential +25, and is arranged to permit tapping off any desired intermediate potential value, while normally left isolated from the tapping connection; furthermore, in the interests of pleasant control, any desired potential may be selected by just "touching" the selector structure at the desired point, which preferably is shown off by appropriate markings as considered hereinafter. To this end, the resistor co-operates with a flexible contact-rail 22, connected to the active terminal of reservoir condenser 1, through lead 3. This contact-rail faces the resistor-surface throughout its length, and is normally maintained a small distance off the resistor-surface; a desired spot of contact rail may be urged into engagement with a corresponding resistor-point to establish a contact therewith.

One suitable form of mechanical construction, suitable for use in a radio receiver, is shown in Figs. 3, 4 and 5, wherein the resistor is wire-wound, and supported by a strip-shaped former 241, the wire effectively forming a multitude of collector-spots closely adjacent to each other. The contact-rail 22 is supported by a strip 222 of Celluloid or like isolating and flexible substance, along one of the long edges thereof, the other edge of the supporting strip being fixed on part 29 of the chassis 291 by means of rivets. The contact-rail may be formed of, or may comprise, a metal deposit on the Celluloid plate, the latter serving to isolate the operator from the contact-rail. By pressing down the Celluloid plate at the desired spot by means of the finger-tip, a comparatively sharply localized bend will take place, whereby the metal rail may be urged against the resistor strip at a comparatively sharply defined point or area. This bend will completely disappear as soon as the pressure is released, and the possibility of false contacts may be prevented with great reliability, with the disposition as proposed. If the device serves as the tuning dial of a radio receiver, the Celluloid plate may be transparent, and a further plate 223 may be arranged behind, which is marked with the call-signs of the desired stations, with frequency graduations and like indications; the plate 223 is supported in a groove of element 29 of the chassis, and may readily be replaced, to meet with changes in the frequencies of the transmitter stations.

Considering now more particularly the discriminator circuit in Fig. 2, there is provided a thermionic tube 4 associated with a balancing potentiometer comprising a contact-finger 13, fast on the spindle 8 of the tuning impedance 9, and a resistor 27 connected between ground and the potential +25; this resistor may be of semi-circular shape, the tuning impedance being adapted to move through 180°. The control grid of tube 4 is connected to the active condenser terminal through a biased diode 17 disposed as in Fig. 1. The cathode of the tube is connected to contact-finger 13 through two biasing sources of potentials 15a and 16a, generally disposed as the sources 15 and 16 in Fig. 1, and formed of cathode-resistors providing automatic bias. Stabilizing leak resistors 23 and 18 are disposed as in Fig. 1.

The motor 6 is of the reversible type, for instance having two motor-coils, and the sense of rotation is directly defined through the stored potential. The anode-circuit of tube 4 includes the energizing coil 28 of a motor-relay of the three-position type; the central position corresponds to the de-energized condition of the motor, while the left-hand and right-hand contacts serve respectively to energize one motor-coil or other, to cause clockwise or counter-clockwise rotation of spindle 8.

The operation of the arrangement in Fig. 2 is as follows: The control grid of tube 4 is normally biased to a moderately negative value, the anode-current being moderate, causing the central relay-contact to be closed, and the motor to be de-energized. After a desired potential is impressed across the reservoir condenser 1, the potential of the grid is increased, or decreased, as the case will be, and the anode-current increases, or decreases, causing respectively the left-hand or right-hand relay-contact to be closed; the consequent clockwise, or counter-clockwise, rotation of spindle 8 causes the potential of contact-finger 13 to be increased, or decreased, as the case will be, until the potential of this contact-finger approximately equals the potential of the active condenser terminal. Normal grid bias and anode-current are thereafter restored, and the central relay-contact is closed again, to de-energize the motor.

In Fig. 6 there is shown another form of discriminator system for setting the arresting position of the motor in response to the potential across the condenser 1, which latter may be charged as indicated in Figs. 2 and 3. Auxiliary A. C. tensions are employed in this arrangement, and these, after rectification and appropriate amplification and control, through the discriminator system, may easily be injected in a desired circuit for controlling the sense of rotation, and the arresting position of the motor. These auxiliary A. C. tensions may be derived from an auxiliary source 60 which may be an oscillator of moderately high frequency, e. g. 50 kilocycles, and especially provided in the receiver to this end; such an oscillator, as indicated hereinafter, would conveniently serve for various other control purposes in the receiver. In fact, the operative frequency of this source 60 may vary between very wide limits; the amplitude should be kept near a predetermined value, with moderate accurateness. In alternative arrangements, energy from the A. C. mains may be applied to the tube 36, or a harmonic derived from the mains; or a local beat oscillator may be provided for reception of C. W. signals and simultaneously serving for the present purpose. This source for convenience will be referred to hereinafter as H. F. oscillator. The grid circuit of the H. F. amplifier tube 34 is in substance arranged as the relay-tube in the foregoing arrangement, and the H. F. potential is applied to the grid through the condenser 801. As shown, the arrangement is such as to permit the separate detection of the off-balance condition, in the two senses, since this will greatly facilitate the design of the discriminator system. To this end, the anode circuit of the H. F. amplifier tube is arranged to feed, through the leads 35 and 36, two rectifiers 40, 41, which may for instance be of the diode type, of which the diode 40 is arranged to detect "too high" a potential at 3, whereas the diode 41 is arranged to detect "too low" a potential at 3. In the instance shown, the two diodes are respectively associated with the input circuits of thyratrons 42, 43, of which the thyratron 43 when energized would cause a clockwise rotation of the motor 6, whereas 42 when energized would cause a counter-clockwise rotation. The general circuit arrangement of the thyratrons or like devices is of course well-known in the art and it is sufficient here to state that the anode-cathode path of the two thyratrons is associated with an A. C. mains supply 44, which may be kept distinct from the D. C. grid circuit of the discriminator system, since the control potentials for the grid circuits of the thyratrons may readily be injected between grid and cathode. The plate circuits of the thyratrons are associated with an appropriate differential transformer system 47, which may directly co-operate with the rotor of the motor 6, the field coil of which may be energized at all times.

The grid of the thyratron 42 is connected through the load resistor 46 to a substantial negative potential with respect to the cathode. Accordingly when the potential at 3 is "too low," no H. F. energy is applied to the diode 40, and the thyratron is left excess-biased. When the condenser is nearly in the balanced condition, a substantial H. F. potential is applied to the diode 40 which is in substance predetermined, whereby accordingly the negative excess-bias of the thyratron 42 will be lowered in a definite proportion, the potential at 45 which provides the excess-bias, being adjusted in such a way that the thyratron will be with reliability, prevented from being triggered, even when there is a small "positive" unbalance at 3, to ensure adequate stability. However when the potential at 3 is "too high" in an appreciable proportion, with respect to the foregoing case, the decreased negative bias should be able to cause the triggering of the thyratron 42; the resulting anode-current causing counter-clockwise motor rotation, until balance at 3 is reestablished in substance.

The grid of the second thyratron is connected through the load resistor 50 to a potential 51, which is slightly negative with respect to the cathode. In the absence of injected potentials, this thyratron will be in the triggered condition. The potentials from 50 are arranged to increase the negative bias, in proportion to the H. F. energy of the tube 34. When the potential across the condenser 1 is "too high," a substantial negative injected totential will prevent the thyratron from being triggered; and the level of energy at 41 is likewise arranged to be sufficient to prevent the triggering, even if the gain of the tube 34 is moderate, the condenser being roughly in the balanced condition. However when the gain at 34 is low, the potential at 3 being "too low" in an appreciable proportion, the negative grid bias at 43 will remain at a rather low value, and accordingly this thyratron will be energized and will cause clockwise rotation of the motor to restore the condition of balance.

Figures 7, 10:
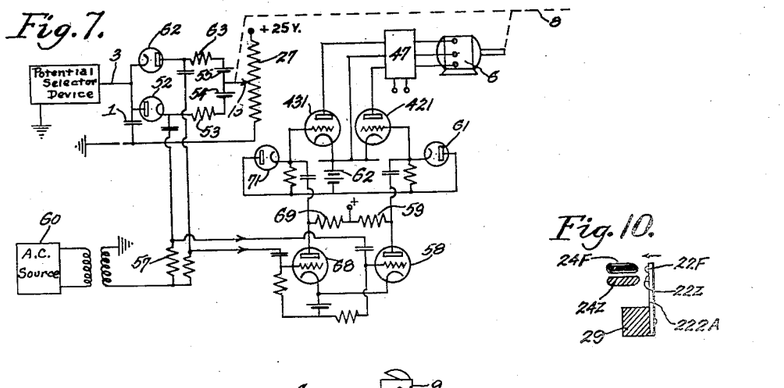
Fig. 7 illustrates still another form of discriminator circuit.
Figs. 9 and 10 show constructional details of the potential selector represented in Fig. 8.

Fig. 7 shows another arrangement employing auxiliary A. C. or H. F. tensions; this arrangement provides further ease of initial adjustments and of circuit independency. A rise and fall of potential at 3, with respect to the balanced condition, is in the present case again detected separately; to this end there are provided two bridge connections of substantially alike construction, respectively including a unidirectional conductor, an associated resistor and a biasing source of potentials or analogous means for providing a "marginal" action. The operation of this circuit depends on the quick change of conductibility of a diode or other unidirectional conductor, in response to a small change, in the positive sense, of the potential applied across anode and cathode, when the steady potential is roughly zero. This change in conductibility is arranged to vary the input impedance of an associated amplifier tube, or to effect an analogous variation in the distribution of an A. C. or H. F. tension impressed on the system; this auxiliary tension after rectification and conveniently after amplification, is injected in the desired circuit.

As shown, the condenser 1 is connected to the balancing slider 13 through two parallel-connected balancing paths respectively including the series-connection of the diode 52 or 62, resistor 53 or 63 of very high value such as 10 megohms, and biasing battery 54 or 55; the cathode of the diode 52 is normally at a slightly negative potential such as —2 volts, whereas the anode of the diode 62 is normally slightly positive, ensuring that the condenser is in balanced condition. Accordingly both diodes are normally conducting, and act jointly to permit the balancing condition to be reached, the resistors 53 and 63 acting as a potentiometer, whereby the potential at 3 through leakage, tends to assume that of the slider 13. Of course a separate slider might be provided in association with each diode-bridge, this slider co-operating with the same or with a different potentiometer and in either case, the batteries 54, 55, might be dispensed with.

The operation of the two diode bridges offers a considerable similarity. When the potential at 3 is "too high," the diode 52 is with certainty left conducting, and will also remain conductive when the potential at 3 is not appreciably "too low"; however when unbalance in the negative sense reaches about 1.5 volts or more, the diode 52 will become non-conducting. The diode 52, from the high-frequency point of view, is arranged to shunt the grid-cathode path of the H. F. amplifier tube 58, to which are applied H. F. potentials from the source 60, through a resistor 57 of substantial value; a conventional grid leak is provided and the tube 58 is arranged to operate under optimum conditions at all times. The resistor 57 in combination with the effective internal resistance of the diode 52, acts as a potential divider, in shunt across the output circuit of the H. F. oscillator. Accordingly, when the resistance of the diode 52 is high, a substantial H. F. voltage is impressed on the input circuit of the tube 58; however when the diode is conducting, the internal resistance thereof will be low as compared with the value of the associated resistor 57, and no appreciable voltage will be impressed on the amplifier 58.

It will thus be understood that, when the condenser is in a balanced condition, no appreciable voltage appears in the output circuit of either amplifier 58, 68, whereas when the potential at 3 is "too low," a substantial voltage is produced across the anode load resistor 59 of the tube 58; similarly when the potential at 3 is "too high," a potential will appear across the load resistor 69 of the amplifier 68.

The voltages across the load resistors 59, 69, are respectively rectified at 61, 71, and are applied to the grids of the thyratrons 421, 431, the anode-circuits of which are arranged as in the foregoing arrangement; these thyratrons are normally both excess-biased by means of a battery 62. Accordingly when unbalance is in one sense or the other, one or the other of the two thyratrons will be triggered to restore the condition of balance, together with the required setting of the control impedance.

In those arrangements wherein it is desired accurately to select a desired one among a very high number of possible positions, as for instance when it is desired in a radio receiver, to select the desired frequency out of a range of frequencies of several hundred kilocycles width, and with a degree of accuracy of a few hundred cycles, it is difficult in practice, with the arrangements considered more particularly in the foregoing, to provide a sufficient potential difference between the potential values characterizing the different positions or frequencies, and the discriminator device may not therefore operate with sufficient reliability. This inconvenience in accordance with a feature of the invention, is obviated by adjusting the utilization device in at least two control steps or degrees, of which the first control step may consist in broadly selecting or making effective the desired position, and subsequently making effective the desired accurate position, or tuning frequency, within the thus defined broad range. Each control step involves the storage, across a distinct associated reservoir condenser, of a potential of characteristic amplitude.

Figures 8, 9:
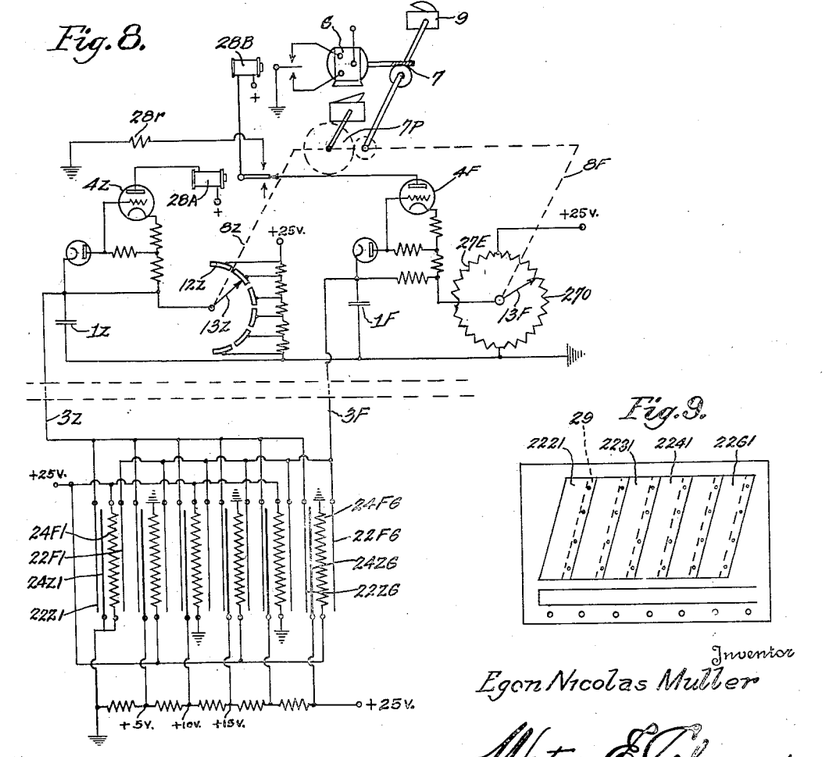
Fig. 8 illustrates a preferred arrangement, involving the selection, in sequence, of one among a plurality of broad ranges of motor positions, and of a narrow position within the desired broad range, in accordance with the combined effects of the potentials respectively stored across two reservoir condensers.

The arrangement shown in Fig. 8 involves dividing the available tuning range, or range of possible positions, into a predetermined number of zones, or bands, or sub-ranges, there being six such zones in the particular instance illustrated, this selection being performed through the intermediary of the potential stored across a reservoir condenser 1Z. As will be more fully apparent hereinafter, each of these zones may be selected with great reliability, since the full control voltage of the source of voltages +25 is available, and since this voltage may be very considerable, having regard to the low number of possible positions. On the other hand, the further reservoir condenser 1F operates with respect to each of the six zones or sub-ranges of possible positions, and it is applied to serve in connection with all the different zones or sub-ranges.

Each of the reservoir condensers 1Z, 1F, has one terminal grounded, the other one being connected through a lead respectively indicated at 3Z and 3F, to the potential selecting structure at the remote control point, or control points; this structure is shown in the lowermost portion of Fig. 8, and will be considered first.

The potential selector structure includes a plurality of resistor sections, respectively indicated at 24F1 ... 24F6, serving to select the potential which is impressed across the reservoir condenser 1F, each resistor-section being allotted to one of the six zones. Each of these resistors is associated with a flexible contact-rail, the different rails being indicated at 22F1 ... 22F6, and being adapted to establish a contact with the resistor section at the selected point. The different resistors 24F1 ... are all connected in parallel and across the control voltage supply +25, and the contact-rails 22F1 ... are all connected directly to the lead 3F. Odd and even resistors 24F1 ... have their lower terminals connected respectively to ground and to the point of highest positive control potential, +25, for the purpose indicated hereinafter; however, the operation proper of the potential selector system is not thereby affected.

The zone-responsive potential is selected through the intermediary of a potential divider, conveniently connected across the same control voltage supply +25, and provided with taps +5, +10 ..., the potentials of which are preferably spaced substantially uniformly. These taps are respectively connected to stationary rigid contact-rails 24Z1 ... 24Z6, associated with flexible contact-rails 22Z1 ... 22Z6, adapted to establish a contact at the selected point. The different contact-rails 24Z1 ... are arranged in proximity of the resistor-sections 24F1 ... relative to the corresponding zones, the arrangement being such that the operator may simultaneously make effective a contact between the elements 24Z1 ... —22Z1 ... and the elements 24F1 ... —22F1 ..., by simply touching the desired point of the contact-structure with the finger-tip.

Indications relative to the selectable positions, such as the tuning frequencies or call-signs of the different radio-stations, are preferably disposed in proximity of the corresponding "touch" selector points. A suitable form of mechanical construction is shown in Fig. 9, wherein the general disposition of the selector structure and associated tuning dial may be similar to that in Fig. 3; however, in order that the desired point may be "touched" with sufficient ease and accuracy, the longitudinal dimensions of the touch-area are very considerable, each contact-rail 24Z1 ... and corresponding resistor-section 24F1 ... being associated with a distinct dial portion or field, as indicated schematically at 2221 ... 2261, all these dial portions being approximately arranged in parallel, and cooperating preferably with a single pointer as considered hereinafter.

Fig. 10 shows the relative disposition of a stationary contact-rail such as 24Z and corresponding resistor-section such as 24F, and of the therewith associated flexible contact-rails such as 22Z and 22F, carried by a transparent Celluloid plate 222A.

I shall now proceed to the description of the discriminators respectively associated with the reservoir condensers 1Z and 1F. These discriminators are of generally similar construction, and substantially as disclosed in Figs. 1 and 2. The zone-responsive discriminator includes a thermionic tube 4Z having its grid associated with the active terminal of the reservoir condenser 1Z, the cathode being associated with a contact-finger of the potentiometer 13Z adapted to sweep over the stationary contact-studs 12Z... which are exactly contiguous, and connected to taps on a potential divider associated with the potential supply +25. In the particular construction shown, the contact-studs 12Z are positioned along a semi-circle. contact-finger 13Z being fast on the spindle 8Z of the tuning impedance 9, this spindle being geared to the spindle of the motor 6 through the normal slow-motion drive 7 and through a further gearing 7P having a 1:6 ratio, for a purpose to be considered hereinafter.

The anode of tube 4Z is connected to the high-tension supply through the energizing coil 28A of an electromagnetic relay of the three-position type, the purpose of which will be detailed hereinafter. The second discriminator, responsive to the selected "fine" position, includes a thermionic tube 4F having its grid associated with the active terminal of condenser 1F; the cathode of the tube being associated with a contact-finger 13F fast on spindle 8F which is geared to the motor-spindle through the gearing 7. Contact-finger 13F is adapted to sweep over one or other of two potentiometer resistors 27O and 27E which are connected in parallel and across the potential supply +25, and are disposed along a circular contact-path.

It will be understood that each time contact-finger 13Z moves through the width of one contact-stud corresponding to one zone of frequencies, contact-finger 13F will move across one or the other of the resistors 27O, 27E, these two resistors serving respectively for odd and even zones. Whereas a certain selectable frequency may thus correspond to approximately a maximum potential as tapped off say from 27O, a slightly higher frequency may correspond to approximately the same potential value from 27E, providing the adjacent zone and contact-stud 12Z are made effective; correspondingly the frequency markings in the different portions or fields of the potential selector mechanism considered hereinbefore, are relative to frequencies progressively increasing from top to bottom, for odd as well as for even fields.

The means for combining the effects of the two stored potentials and of the corresponding discriminators, will now be considered more particularly. The reversible motor 6 is controlled by means of a three-position relay 28B, the energizing coil of which has one terminal connected to the anode supply source, while the other terminal may be connected to the anode of tube 4F under certain conditions, and is to this end connected to the movable input contact of the three-position relay 28A referred to hereinbefore. The central stationary contact of this relay is connected permanently to the anode of tube 4F, while the right-hand contact is idle, and the left-hand contact-point is connected to ground through a resistor 28r of sufficient low resistance to permit a flow of current markedly higher than the maximum flow of current of tube 4F.

The operation of the circuit in Fig. 6 is as follows: The potentials at 3Z and 13Z on one hand, and of 3F and 13F on the other hand, are normally balanced, owing to the leakage paths of the condensers 1Z, 1F. The anode currents of tubes 4Z, 4F, in such condition, assume a normal intensity, which is moderate, the anode-current of tube 4Z causing the central relay-contact at 28A to be effective, whereby the free terminal of the motor-relay 28B is connected to the anode of tube 4F, the central relay-contact being also closed at 28B whereby the motor is normally switched off. The condensers 1Z, 1F, may be charged to the desired characteristic potential, by means of the potential selector mechanism, charging being in a brief fraction of a second, and the leads 3Z, 3F, may thereafter be left isolated from the potential selector device. Assuming that the thus effective potential across condenser 1Z is different from the potential of contact-finger 13Z as defined by the instant positioning thereof, the negative grid bias of tube 4Z may be decreased or increased, as the case will be, with respect to its steady value, and the consequent increase or decrease of anode current causes the input relay-contact to become disassociated from the motor control system, and at the same time the left-hand or right-hand fixed contact-blade, as the case will be, will become associated with the input relay-contact. In the first case, there will be a substantial flow of current through resistor 28r and motor-relay 28B, whereas in the second case there will be no flow of current whatever through relay 28B. The motor therefore will be caused to rotate clockwise, or counterclockwise, respectively, i. e. in a sense such as to tend to restore balance between the terminals 3Z and 13Z; as soon as the proper contact-stud is reached by contact-finger 13Z, the central contact is closed again at 28A. The motor control relay 28B is now under the sole control of tube 4F. According as the potential at 3F happens to be higher or lower than the potential of contact-finger 13F, the consequent increased anode current or decreased anode current of tube 4F, causes one or other of the outer contacts to be closed at relay 28B, causing the motor to adjust the spindle 8F and contact-finger 13F in a compensatory sense, until the potentials at 3F, 13F, are balanced again, whereupon the motor becomes de-energized, the steady condition of the system being restored.

It may be observed that, while contact-finger 13Z is being adjusted under the influence of the potential across condenser 1Z, and tube 4F is ineffective, the contact-finger 13F may happen to travel a plurality of times across the associated potentiometer-resistors, whereby the potentials at 3F and 13F may become balanced a plurality of times; however, it will be understood that the operation of the system is not thereby concerned.

Figures 11, 12:
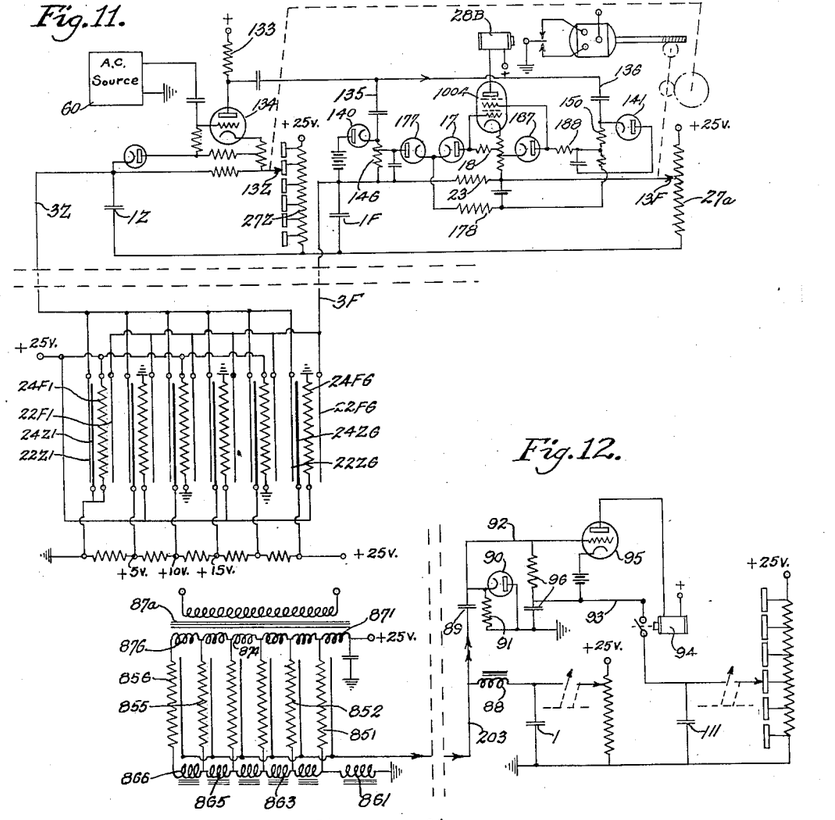
Fig. 11 illustrates an alternative arrangement for combining the effects of two stored indications.
Fig. 12 illustrates still another motor control circuit operating in accordance with the combined effects of two stored potentials, wherein a simple potential selector construction simultaneously permits the selection of two distinct potentials, which are A. C. and D. C. potentials respectively.

The control circuit shown in Fig. 11 is arranged to co-operate with a potential selector device as shown in the lower left-hand portion of Fig. 8, and includes the two reservoir condensers 1Z and 1F, the purpose of which is the same as in Fig. 8. The discriminator circuit associated with the zone-responsive condenser 1Z, includes an amplifier tube 134, the control grid of which is operatively associated with the active condenser terminal, and the cathode of which is operatively associated with contact-finger 13Z of a potentiometer having a number of broad contiguous contact-studs, relative respectively to the different selectable zones. The control grid of tube 134 is furthermore fed with A. C. potentials from an auxiliary generator 60, the purpose of which is the same as in the discriminator circuit considered hereinbefore with reference to Fig. 6. The anode circuit of the amplifier 134 is provided with a load resistor 133, across which may be set up A. C. potentials, and which is coupled through lead 135 to a rectifier 140 provided with a load resistor 146, and which through the further lead 136 is coupled to a rectifier 141 provided with a load resistor 150. The rectifier 140, of the diode type, is arranged to produce potentials of positive polarity, relative to lead 3F, and is provided with a threshold bias serving to prevent the appearance of rectified potentials until the amplitude of the A. C. potential impressed upon the rectifier exceeds a comparatively high threshold value, as considered more particularly hereinafter. These potentials may be derived through a resistance-capacity filter, which may consist of a condenser shunted across a portion of the load resistor. The rectifier 141 on the other hand, serves to produce rectified potentials of positive polarity across load resistor 150, associated with a similar resistance-capacity filter, and is devoid of a threshold bias.

The discriminator circuit associated with reservoir-condenser 1F relative to the selection of a desired "fine" position, includes an amplifier tube 1004, having a main control grid and a so-called gain control grid capable of altering the anode current of the tube in the same sense. The main control grid is operatively connected to the active terminal of condenser 1F, whereas the cathode is operatively associated with contact-finger 13F of a potentiometer which conveniently is provided with two resistors of semi-circular shape as indicated in the right-hand portion of Fig. 8, one of the resistors only, denoted by the reference number 27a, being shown. The connection between the active terminal of condenser 1F and the main control grid includes the load resistor 146 of rectifier 140, referred to hereinbefore, whereby a potential dependent on the condition of balance in the zone-responsive discriminator, may be injected. The said connection furthermore includes two limiting devices consisting of diodes 177 and 17, respectively biased negatively and positively, relative to the potential of contact-finger 13F, by connecting the cathode of diode 177 to the proper potential through a resistor 178 of high resistance value, and on the other hand by connecting the anode of diode 17 to the proper potential tapped off from the cathode load resistor of the tube 1004 through a resistance 18 of high value. These biased diodes serve to prevent the bias of the main control grid of tube 1004, from reaching bias values very considerably different from the steady bias value, in order that under all conditions the gain control grid may be capable of exerting some control effect. The steady bias of the main control grid, in the absence of a potential specifically impressed across reservoir-condenser 1F or across resistor 146, is in the main defined by the leak resistor 23 connecting the active condenser terminal 3F to contact-finger 13F.

The gain control grid of tube 1004 is connected to contact-finger 13F through a biasing source of potentials of negative polarity having moderate amplitude, through the load resistor 150 of the diode 141, referred to hereinbefore, and through a resistor 188 of comparatively high resistance; the gain control grid on the other hand is directly connected to a point of slightly negative potential relative to the cathode, tapped off from the cathode load resistor, through a diode 187 having its cathode connected to the fixed potential. The anode circuit of the D. C. amplifier tube 1004 comprises the energizing coil 28B of the motor control relay, which latter is of the three-position type, and performs the function of relay 28B in Fig. 8.

The circuit of Fig. 11 operates as follows: As long as no potential is effective across the reservoir condensers 1Z, 1F, the grid bias of tube 134 assumes a moderate value, due to leakage, giving rise to A. C. potentials of moderate amplitude, across the diodes 140, 141. On account of the large threshold bias of diode 140, there will be no rectified potential across resistor 146; the bias of the main control grid of tube 1004 will not therefore be affected by the potential across condenser 1Z and contact-finger 13Z, and will assume a moderate negative bias, due to leakage between 3F and 13F. On the other hand, a substantial positive potential will be effective across load resistor 150, causing the junction of resistor 188 and diode 187 to be higher than the fixed limiting potential whereat the cathode of the diode is connected; the diode 187 will accordingly be virtually connected directly to the said fixed potential, whereby the gain control grid will assume a comparatively low negative bias relative to the cathode of the tube. The anode current of tube 1004 will therefore assume a moderate amplitude, and relay 28B will be caused to deenergize the motor.

Now suppose that potentials of the desired amplitude are selected at the distant control point, and impressed across the condenser 1Z, 1F. According as the potential across condenser 1Z is lower or higher than the instant potential of contact-finger 13Z, the negative bias of tube 134 will be increased or decreased, and the gain of the tube as well as the amplitude of the A. C. potential applied to diode 140 will be decreased, or increased. In the first case, resistor 146 will continue, not to exert any influence upon the main control grid of tube 1004, whereas in the second case the threshold of operation of the diode 140 will be overcome, whereby a potential of substantial amplitude will be produced across resistor 146; to lower the negative bias of tube 1004 in substantial proportion; overload caused by positive bias is prevented due to the presence of the limiting diode 17.

At the same time, the decreased, or increased, output of tube 134, as the case will be, will cause a reduced potential drop across load resistor 150, or will further increase the potential across this resistor, whereby in the first case the negative bias of the gain control grid of tube 1004 may be considerably increased relative to its normal value, the diode 187 being non-conducting; whereas in the second case diode 187 will be left conducting and the grid bias will be left unchanged. Summarizing, it will be seen that unbalance, in the negative, of the active terminal of condenser 1Z relative to the instant potential of contact-finger 13Z, will leave unchanged the normal grid bias of tube 1004, but will substantially increase the negative bias of the gain control grid; on the other hand, unbalance in the positive sense, at 3Z, will substantially reduce the negative bias of the main control grid at 1004, but will leave the gain control grid at its normal moderate negative bias value; in the first case, the anode current of tube 1004 may be substantially decreased, whereas in the second case it may be substantially increased. It will be observed that, since there are but a few selectable amplitude positions of contact-finger 13Z, and of potential values of condenser terminal 3Z, each position may correspond to a substantial potential change; accordingly even if the potentials of 3Z and 13Z have not exactly their theoretical required relative values, a substantial change in the grid bias in one sense or other, with respect to the steady bias values of tube 134, may take place, which, as considered in the above, may give rise to a substantial change of the bias values of the two control grids of tube 1004. It may therefore easily be arranged that the said change may be comparatively higher than the change which under any conditions may be impressed upon the main control grid of tube 1004 through the potential difference between the active terminal of condenser IF and contact-finger 13F. For instance, if the potential at 3F is comparatively very low relative to the potential at 13F, it may nevertheless be ensured that, if there be unbalance at 3Z in the positive sense, the potential injected at 146 may cause the main control grid of tube 1004 to become higher than the instant potential at 13F so that the consequent increased anode current of this tube by operating the three-position relay 28B in the proper sense, may cause the motor to rotate until contact-finger 13Z reaches the contact-stud whereat the potential at 3Z is balanced. During such rotation, the potential change of contact-finger 13F will not substantially affect the grid bias of the main control grid of tube 1004 since the injected potential at 146 remains at a substantial value. After the potentials at 3Z and 13Z are balanced, the proper zone being selected, the bias values of the two control grids of tube 1004 will not be further affected, as indicated in the above, except by the potential difference between 3F and 13F. The discriminator associated with reservoir condenser IF may therefore operate in the usual manner as explained in connection with Fig. 2, and it will be understood that in practice the motor will continue to rotate in the sense defined by the zone-responsive discriminator.

If the zone-responsive discriminator happens to be unbalanced with the potential at 3Z at a lower value than the potential at 13Z, there will be no injected potential at 146, and it may therefore happen that the potential at IF be higher than the potential at 13F, causing the main control grid of tube 1004 to assume a comparatively low negative bias, which may not however become lower than the fixed limiting potential defined by resistor 18.

Since on the other hand the negative bias of the gain control grid may be increased in a desired proportion and may even exceed the cut-off point, a sufficiently decreased anode current of tube 1004 may be ensured, and the relay 28B will cause rotation of the motor in a sense such as to reestablish balance at 13Z relative to the potential at 3Z, whereupon some further rotation of the motor may ensure balance in the frequency-responsive discriminator, without further change in the zone-responsive discriminator, since contact-finger 13Z will continue to be in contact with the proper broad contact-stud.

In the two-step control system illustrated in Fig. 12, one of the storage condensers is arranged to be charged indirectly, by means of rectified H. F. potentials, and the "touch-line" 203 in this instance is arranged to carry simultaneously a selected D. C. potential, in response to a selected spot in the "touch-plate" system, and a selected amplitude of H. F. voltage. An important advantage of a construction of like character, as applied to a two-step control system or the like, is to permit the use of but one touch-resistor and associated "touch" contact-rail, and the construction may be as indicated in connection with the one-step control system in Figs. 3, 4 and 5.

In the instance shown, the coarse storage condenser 111 is caused to assume one amongst six selected potential values whereas the fine storage condenser may be charged as indicated hereinbefore.

From the D. C. point of view, all the "touch" resistors 851, 852 ... are connected in parallel across substantially the same D. C. potential supply +25, the drop of potential in the impedances 861 ... 871 ... being kept sufficiently low, as compared with that across 851.

From the A. C. point of view, voltages of progressively increasing values, with respect to ground, are applied to the impedances 871 ..., e. g. by induction from the primary of a transformer 87a, associated with a desired source of A. C. tensions, of substantially non-critical frequency. The choke coils 861 ... are provided to prevent the secondary sections of the transformer 871 ... from being short-circuited, through the resistors 851 ... which offer a low A. C. impedance path. It will be seen that an appreciable H. F. voltage with respect to ground is discernible at all of the various "touch" resistors 851 ... including the first one 851.

On depressing any selected spot in any of the various resistors, a predetermined potential is applied to the "fine" storage condenser 1 through the choke coil 88, and over the lead 203, to operate the normal charging thereof.

Simultaneously a definite H. F. voltage is produced across the terminals of the choke coil 88, and is impressed through the condenser 89 to a rectifier 90, the resultant D. C. potentials across the load resistor 91 being truly proportional to the impressed H. F. voltage, and being positive with respect to ground, this D. C. potential being applied through the leads 92, 93, to the upper terminal of the coarse storage condenser 111.

A switch is arranged in the lead 93 to interrupt the charging path of the condenser 111, when the "touch" ceases, to avoid a discharge of the condenser; this switch in the instance shown is actuated through a relay 94 arranged in the anode circuit of an amplifier tube 95 which is normally excess-biased, to open the relay-contact. However as soon as the operator touches any selected spot of any touch-resistor, a substantial potential is rectified at 90 as indicated hereinbefore, and is impressed through the lead 92 to the grid of the tube 95 to remove the excess-bias, thereby causing a sufficient flow of current through the relay to close the contact, whereby to permit the condenser 111 to be charged. The operation of the relay is not substantially affected through the variable bias of the tube 95. It may be observed that the load resistor 91 adapted to charge the storage condenser 111 of high capacity, should present a relatively low value such as e. g. 20,000 ohms, to permit a quick charging of the condenser in response to a brief touch period. In the instance shown in Fig. 12, the condenser 111 may be charged through a filter 96 including a resistance and capacity, and adapted to compensate for the small inertia of the electromagnetic relay 94.

Figure 13:
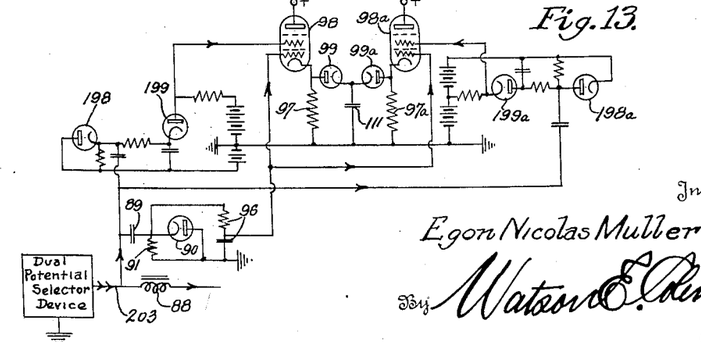
Fig. 13 illustrates an alternative to the circuit in Fig. 12.

Fig. 13 shows another arrangement operating in a purely electric fashion, to operate the charging of the storage condenser 111. This condenser may be arranged to be charged in response to the amplitude of H. F. voltages derived from a touch-line 203 as in the instance of Fig. 12, but an arrangement of this general character would also be suitable for effectuating an indirect charging of the condenser 111 in response to a transient phenomenon, and in the main it would only be necessary to provide a desired source of control potentials for interrupting the normal charging and discharge paths of the storage condenser.

As shown, the condenser 111 is adapted to be charged in response to the potential across the cathode load resistor 97, 97a, of one or other interposed amplifier tube 98, 98a, to the main control grid of which are impressed the potentials rectified at 90, this rectifier if desired being arranged as in the foregoing arrangement, one of the tubes 98, 98a, being normally effective to cause an increased potential across the condenser 111, whereas the other tube is adapted to bring about a decreased potential across the storage condenser. Each charging path includes a diode, 99, 99a, and since these diodes are connected in opposition, one or other will be conducting when there is a difference in potential between the condenser 111 and the cathode potential of the tubes. It may be observed that the arrangement is conveniently such that the cathode potential in both tubes is in substance the same, and is in the main that across the load resistor 91 of the rectifier 90.

The interposed tubes comprise in the instance shown a second control grid, which is arranged to assume a predetermined potential during the charging period. Thus, when there is a flow of H. F. current in the lead 203, the second control grid of the tube 98 is in substance biased to the cut-off point, whereas the cathode will in substance assume ground potential, i. e. a lower potential than may at any time be reached by the storage condenser, and the associated diode will accordingly at any rate be non-conducting to prevent leakage through the resistor 97; the second control grid of the tube 98a on the other hand is in the absence of H. F. currents very slightly negative with respect to the cathode, to cause a lower cathode potential of the cathode of tube 98a than may at any time be effectively assumed by the storage condenser, whereby to block this discharge path. Whereas these extreme potential values of the two auxiliary control grids are normally operative, it will be understood that a flow of H. F. current in the lead 203 will immediately cause these grids to assume the above predetermined potential values, and to this end, a H. F. voltage from this lead is also applied to an auxiliary rectifier 198 associated with the tube 98, to raise the potential from excess-bias to a substantial positive value as defined by a limiting means 199; whereas a further H. F. voltage is impressed on the auxiliary rectifier 198a to lower the potential of the auxiliary grid of the tube 98a from a normal substantial positive value to a predetermined moderate potential as defined by the associated limit means 199a.

The utility of a disposition for showing off the indications stored across the reservoir condenser, or reservoir condensers, will readily be appreciated. Such a disposition may be particularly simple when the potential selector mechanism associated with the reservoir condensers, is arranged physically in proximity of the radio receiver which it is desired to control, and of the therewith associated motor. The potential selector device is conveniently provided with indications relative to the tuning frequencies that may be selected, which as pointed out hereinbefore, may conveniently take the form of a tuning dial, and it is useful in such case to illustrate the stored indications, or the setting of the tuning means controlled in accordance with these indications, on the selector dial proper, because the provision of a plurality of dials would be both expensive and would render difficult the consideration thereof, particularly so as these dials in practice may have very large dimensions.

It will also be appreciated that the motor control systems considered hereinbefore more particularly, which are designed to permit the selection of any desired one among a large range of possible positions, such as tuning frequencies, present the considerable advantage that certain particular intermediate positions of particular utility, such as the frequencies of certain selected transmitter stations, may readily be selected without it being necessary to provide a special preliminary adjustment for these particular positions.

Whereas my invention is described in connection with some typical embodiments thereof, various modifications will suggest themselves to those skilled in the art.

I claim:

1. In an indirect control system, the combination of a utilization device to be positioned indirectly; drive means for effecting the said positioning; a reservoir condenser for storing energy at a D. C. potential corresponding to a selected position of the utilization device; a D. C. carrying lead permanently connected to the reservoir condenser; means including a voltage supply for selectively defining the charging potential; and means for making and breaking the operative connection between the said lead and the said voltage supply for charging said condenser instantaneously with energy from said voltage supply at the selected charging potential; a further D. C. carrying lead connected with said condenser and the first-named lead; means including a voltage supply having predetermined amplitude characteristics with respect to the first-named voltage supply, controlled by said drive means and operative in connection with said second-named lead to define the D. C. potential of the said second-named lead in response to the position of the utilization device; and means for controlling the effectiveness of the said drive means in response to the potential difference between the said two D. C. carrying leads; whereby said potential difference in substance remains below a desired low value when the required setting of the utilization device is reached.

2. The system set forth in claim 1, additionally characterized by the provision of a leakage path between the said two D. C. carrying leads, for stabilizing the system when the utilization device in substance has reached the required position.

3. The system set forth in claim 1, characterized in that the said first-named voltage supply is a D. C. source of potentials, operative to supply energy at charging potentials differing by relatively small increments of potential, for relatively fine setting of the utilization device.

4. The system set forth in claim 1, further characterized in that the first-named voltage supply comprises a D. C. source of potentials provided with a plurality of taps of different potential values, and operative to supply energy at charging potentials differing by relatively large increments of potential at said taps for relatively coarse setting of the utilization device.

5. The system set forth in claim 1, with said reservoir condenser being charged through manual operation of the potential selector means, and characterized in that said first-named voltage supply is a source of A. C. potentials, and in that there is provided a rectifier between said voltage source and said first-named D. C. carrying lead of the reservoir condenser, to permit the storage of a D. C. potential responsive to the amplitude of the selected A. C. potential; and further characterized in that said means for making and breaking the connection between the first-named lead and voltage supply is provided between said rectifier and the said D. C. carrying lead of the reservoir condenser; and including means for controlling the operation of the said connection making and breaking means, in accordance with a potential defined by the operation of the potential selector means.

6. The system set forth in claim 1, wherein said first-named voltage supply is a source of A. C. potentials, and wherein there is provided between said voltage source and said first-named D. C. carrying lead of the reservoir condenser, a rectifier for supplying to the D. C. carrying lead a D. C. potential proportional to the applied A. C. potential; the aforesaid means for making and breaking the connection between the first-named lead and voltage supply being disposed for selectively controlling the effectiveness of the operative connection between said rectifier and said lead, and provided with control means energized by the D. C. potential produced across said rectifier.

7. The system set forth in claim 1, wherein the said means for controlling the effectiveness of the drive means includes a unidirectional conductor and an impedance element connected in series between said D. C. carrying leads, an A. C. auxiliary voltage source, another impedance element connected in series with said unidirectional conductor across said A. C. voltage source, and means for utilizing the potential drop across the last said impedance element for controlling the effectiveness of said drive means, the magnitude of said potential drop being substantially proportional to D. C. potential difference between said D. C. carrying leads, applied to said unidirectional conductor.

8. In combination, a source of electrical energy, means for deriving energy at a selected potential from said source, and energy storing means connected with said source through the aforesaid means for storing energy at the selected potential; a movable device, motor means for actuating said device, and relay means connected with said energy storing means and operative in accordance with changes in the potential of the energy therein for controlling said motor means and the movement of said device.

9. The combination set forth in claim 8 and including a variable potentiometer device having a difference of potential across its terminals substantially equal to the potential difference of said source, a tap connection between said potentiometer device and said energy storing means, a high leak resistance in said connection, and means for adjusting said potentiometer device in accordance with the movement of said movable device for maintaining said energy storing means energized substantially at the selected potential derived from said source, said relay means being responsive to the difference between said selected potential and the potential of said tap connection.

EGON NICOLAS MULLER.